United States Patent
Remington et al.

(10) Patent No.: US 8,498,945 B1
(45) Date of Patent: Jul. 30, 2013

(54) CLAIM EVALUATION METHODS, SYSTEMS, PRODUCTS, AND DATA-STRUCTURES

(75) Inventors: Royce R Remington, Strongsville, OH (US); Jeffrey A. Brauer, Kirtland, OH (US); John A. Yirga, Shaker Heights, OH (US)

(73) Assignee: Hahn, Loeser & Parks, LLP, Akron, OH (US)

( * ) Notice: Subject to any disclaimer, the term of this patent is extended or adjusted under 35 U.S.C. 154(b) by 3311 days.

(21) Appl. No.: 10/967,084

(22) Filed: Oct. 15, 2004

(51) Int. Cl.
*G06Q 50/00* (2006.01)

(52) U.S. Cl.
USPC ............................................. 705/311

(58) Field of Classification Search
USPC ........................................ 705/1, 311
See application file for complete search history.

(56) References Cited

U.S. PATENT DOCUMENTS

| | | | |
|---|---|---|---|
| 5,189,606 A | 2/1993 | Burns et al. | |
| 5,875,431 A | 2/1999 | Heckman et al. | |
| 5,918,219 A | 6/1999 | Isherwood | |
| 6,272,471 B1 | 8/2001 | Segal | |
| 6,397,202 B1 | 5/2002 | Higgins et al. | |
| 6,615,181 B1 | 9/2003 | Segal | |
| 7,974,850 B2 * | 7/2011 | Courson et al. | 705/1.1 |
| 2003/0135401 A1 | 7/2003 | Parr | |
| 2004/0078250 A1 | 4/2004 | Schorb | |
| 2004/0107121 A1 | 6/2004 | Segal | |
| 2004/0128186 A1 | 7/2004 | Breslin et al. | |
| 2005/0071284 A1 * | 3/2005 | Courson et al. | 705/80 |

OTHER PUBLICATIONS

Victor, Marc B., "Interpreting a Decision Tree Analysis of a Lawsuit," 2001.*
Alkass, S., et al., (1995), "Computer aided construction delay analysis and claims preparation," Construction Management and Economics, 13, 335-352.
Ameen, J.R., et al., (2003), "An Application of regression analysis to quantify a claim for increased costs," Construction Management and Economics, 21, 159-165.
Abdul-Malak, M., et al., (2002), "Process Model for Administrating Construction Claims," J. of Management in Engineering, 18(2), 84-94.
Asselin, T., and Harris, M., (1988-89), "How to Recognize, Preserve, Present, and Prosecute Construction Contractors' Delay Claims," 40 S.C.L. Rev. 943.
Baki, M.A., (1999), "Delay Claims Management in Construction—A Step-By-Step Approach," Cost Engineering, 41 (10), 36-38.
Bordoli, D., and Baldwin, A., (1998), "A Methodology for assessing construction project delays," Construction Management and Economics, 16, 327-337.
Donald J. Fredlund Jr., Robert B. Brown, Frank DeLessio, Business Interruption Claims-Delay Analysis Considerations, pp. CDR.05.1-CDR.05.6, 2003 AACE International Transactions.

(Continued)

*Primary Examiner* — Carrie Gilkey
(74) *Attorney, Agent, or Firm* — Hahn, Loeser & Parks, LLP

(57) ABSTRACT

A method for evaluating a potential claim using a computerized platform is presented. The method comprises the steps of receiving into the computerized platform information relating to a potential claim. Specifically, that information relates to a value of the potential claim, a likelihood of success of the potential claim, and a cost of asserting the potential claim. The method further comprises the steps of calculating an estimated claim valuation based upon the information relating to a potential claim using the computerized platform, and presenting that estimated claim valuation to a user.

18 Claims, 13 Drawing Sheets

OTHER PUBLICATIONS

Kirk D. Gothand, Schedule Delay Analysis: Modified Windows Approach, Cost Engineering, Sep. 2003, pp. 18-23, vol. 45/No. 9, EBSCO.

Guzelain, R., and Samelian, F., "The Productivity Baseline," AACE International Transactions, AACE International, 2003.

Guzelain, R., and Samelian, F., (2003), "Baseline Determination in Construction Labor Productivity-Loss Claims," J. of Management in Engineering, 19(4), 160-165.

Harris, J., Ainsworth, A., "Practical Analysis for Proving Damages," AACE International Transactions, AACE International, 2003.

Kartam, S., (1999), "Generic Methodology for Analyzing Delay Claims," J. of Construction Engineering and Management, 125(6), 409-419.

Kelleher, T., Jr., Smith. S. "Preparing and Resolving Construction Claims/Edition II." Construaction Briefings, Feb. 2000.

Kim, M., et al., (1989), "An Expert System for Construction Contract Claims," Construction Management and Economics, 7, 249-262.

Kumaraswamy, M.M., and Yogeswaran, K., (2003), "Substantiation and assessment of claims for extensions of time," International J. of Project Management, 21, 27-38.

Lee, J., "Construction Delay Analysis Method," AACE International Transactions, AACE International, 2003.

Loulakis, M., et al., "Proving and Pricing a Delay Claim," Civil Entineering, 2003.

Phillip R. McDonald, Construction claims costing for owners and contractors; Construction Management and Economics, 1984, 2, pp. 1-11, E. & F.N. Spon Ltd.

McDuff, C., et al., "Total Cost Construction Claims Tactics," AACE International Traansactions, AACE International, 2002.

Makris, P., (2004), "Eichleay Update," AACE International Transactions, AACE International, 2004.

Dr. Osama Moselhi, Dr. Khaled El-Rayes, Analyzing Weather-Related Construction Claims, Cost Engineering, Aug. 2002, pp. 12-19, vol. 44/No. 8, EBSCO.

Ottesen, J., et al., "Alternative Estimation of Home Office Overhead," AACE International Transactions, AACE International, 2003.

Sanders, M., and Nagata, M., "Assessing Methodologies for Quantifying Lost Productivity," AACE International Transactions, AACE International, 2003.

Sandlin, L.S., et al., (2004), "Phased Root Cause Analysis—A Distinctive View on Construction Claims," Cost Engineering, 46(6), 16-20.

Vidogah, W., and Ndekugri, I., (1998), "A review of the role of information technology in construction claims management," Computer in Industry, 35, 77-78.

Williams, T., et al., (2003), "Structuring a delay and disruption claim: An application of cause-mapping and system dynamics," European J. of Operational Research, 148, 192-204.

Windham, W., (1993), "Construction Law Boom Might be on the Horizon." Feb. 18, Mont.Law. 3.

Kumaru Yogeswaran, Mohan M. Kunaraswamy, Douglas R.A. Miller, Claims for extensions of time in civil engineering projects, Construction Management and Economics (1998) 16, pp. 283-293, E & FN Spon.

James G. Zack, Jr., But—For Schedules—Analysis and Defense, Cost Engineering, Aug. 2001, pp. 13-17, vol. 43/No. 8.

James G. Zack, Jr., Pacing Delays—The Practical Effect, Cost Engineering, Jul. 7, 2000, vol. 42/No. 7, pp. 23-28.

Jergeas et al., Quantifying construction claims using the differential cost method, Construction Management and Economics (1993) 11, pp. 163-166, E & FN Spon.

* cited by examiner

100

| Claim Snapshot | Ranking Method | Score/Value |
|---|---|---|
| 1. Base contract damages and all approved change orders | | |
| A. Base contract amount | Dollars | $10,000,000 |
| B. Percentage of base contract to be completed by time of pursuing claim | Percent | 100% |
| C. Approved change order amount | Dollars | $4,000,000 |
| D. Percentage of total approved change orders to be completed by time of pursuing claim | Percent | 90% |
| 2. Pending/unapproved/disputed change orders ("Pending") | | |
| A. Total value of Pending work to be completed by time of pursuing claim | Dollars | $1,000,000 |
| B. Pending reduction factors | | |
| Waiver provision in contract if undocumented | Y or N | n |
| Quality of documentation (written detailed requests = 10, undocumented oral requests = 1) | Score 1-10 | 7 |
| Availability of witnesses on undocumented or poorly documented Pending (available/local = 10) | Score 1-10 | 6 |
| Written acceptance of Pending | Y or N | n |
| MAXIMUM CONTRACT CLAIM VALUE | | $15,000,000 |
| ADJUSTED CONTRACT CLAIM VALUE | | $14,250,000 |
| 3. Margin | | |
| A. Anticipated percentage margin on contract work | Percent | 10% |
| B. Anticipated percentage margin on change order work (approved and Pending) | Percent | 10% |
| PREDICTED MARGIN ON PROJECT | | $1,500,000 |
| 4. Total job cost | | |
| A. Current total job cost | | $18,000,000 |
| B. Estimated total job cost at completion | | $20,000,000 |
| AMOUNT BY WHICH CONTRACT PLUS PENDING EXCEEDS JOB COSTS | | ($6,400,000) |
| 5. Project retention | | |
| A. What is required under the contract? | Percent | 10% |
| B. What is required under local law (if determinative)? | Percent | 5% |
| MAXIMUM RETENTION AMOUNT | | $1,100,000 |
| 6. Amounts paid and outstanding by contract | | |
| A. Dollars paid to date (for base contract, approved change orders and Pending) | Dollars | $12,000,000 |
| B. Conceded deducts (enter a negative number) | Dollars | $0 |
| PAID TO DATE (adjusted up for deducts) | Dollars | $12,000,000 |
| MAXIMUM CONTRACTUAL OUTSTANDING | | $3,000,000 |
| LIKELY CONTRACTUAL OUTSTANDING | | $2,250,000 |
| 7. Impact damages (non-contractual) | | |
| A. Contractual provisions regarding impact damages | | |
| Impact damages barriers | | |
| Exculpatory clause barring impact claims against owner | Y, N or D (Disputed) | d |
| Lien waiver barring impact claims | Y, N or D | d |
| Notice provision which can no longer be satisfied | Y, N or D | d |
| Force majure clause barring impact claims against owner | Y, N or D | d |
| If any above are disputed, present evaluation of likelihood of success (very likely = 10) | Score 1-10 | 8 |
| IMPACT DAMAGE CONTRACTUAL BARRIER SCORE | | 8 |
| B. Elements of impact damages | | |
| Conventional impact damages | | |
| Extended general conditions (non-labor external costs of remaining on site) | Dollars | $150,000 |
| Additional labor costs and overtime staffing (extra personnel and extra hours) | Dollars | $200,000 |
| Additional equipment costs required to accelerate | Dollars | $400,000 |
| Changed/unknown conditions (in addition to extra labor and/or equipment) | Dollars | $100,000 |
| CONVENTIONAL IMPACT DAMAGES SUBTOTAL | | $850,000 |
| Lost labor productivity | | |
| Labor take off during impacted phase | Dollars | $7,000,000 |
| Number of days worked/week during impacted phase | 5,6, or 7 | 6 |
| Number of hours worked/per day during impacted phase | 8,9,10,11 or 12 | 9 |
| LOST PRODUCTIVITY DAMAGES SUBTOTAL | | $840,000 |

| Claim Snapshot | Ranking Method | Score/Value |
|---|---|---|
| Eichleay damages (Unabsorbed Overhead Damages for Project Delay) | | |
|   Prima Facie Issues | | |
|     Claimant was on "standby" during delay | Y or N | y |
|     Claimant could not take on other projects while on standby | Y or N | y |
|   Name of relevant office | Text | Cleveland |
|   Monthly internal overhead for relevant office | Dollars | $25,000 |
|   Monthly billings for relevant office | Dollars | $1,000,000 |
|   Monthly billings for project | Dollars | $250,000 |
|     Percentage of overhead attributable to project | | 25% |
|   Number of extended project days | Number | 50 |
|     EICHLEAY DAMAGES SUBTOTAL | | $10,417 |
|     SUBTOTAL OF IMPACT DAMAGES | | $1,700,417 |
| Impact damage reduction factors | | |
|   Measured mile | | |
|     Ability to calculate measured mile on comparable same project work | Y or N | y |
|     Degree to which measured mile is representative | Score 1-10 | 8 |
|     Impact damages reduced for reduction factors | | $1,360,333 |
|     ADJUSTED IMPACT DAMAGES (includes contractual barriers) | | $1,088,267 |
| 8. Lost profits (non-contractual) | | |
|   A. Lost profits barriers | | |
|     Claimant can *clearly* establish that it had new project that it was prevented from performing | Y, N or D (Disputed) | d |
|     Exculpatory clause barring lost profit claims against owner | Y, N or D | n |
|     Lien waiver barring lost profits claims | Y, N or D | n |
|     Notice provision for lost profits claims which can no longer be satisfied | Y, N or D | n |
|     Force majure clause barring lost profits claims against owner | Y, N or D | n |
|     If any above are disputed, present evaluation of likelihood of success (very likely = 10) | Score 1-10 | 6 |
|     LOST PROFIT CONTRACTUAL BARRIER SCORE | | 6 |
|   B. Lost profits claimed and reduction factors | | |
|     Losses to Claimant for inability to perform alternative work | Dollars | $1,000,000 |
|     Quality of documentation (excellent documentation = 10) | Score 1-10 | 4 |
|     Quality of witness testimony on lost profits (very strong witnesses = 10) | Score 1-10 | 9 |
|     Lost profits reduced for reduction factors | | $700,000 |
|     ADJUSTED LOST PROFIT DAMAGES (includes contractual barriers) | | $420,000 |
|   C. Impact and lost profits damage cross check | | |
|     Degree project is underwater assuming $0 profit | | ($8,000,000) |
|     Degree project is underwater including anticipated profit | | ($9,500,000) |
| 9. Subcontract Work | | |
|   Evaluation of likelihood of subcontractors pursuing claims | | |
|     Do any of the subcontractors intend to pursue claims? | Y or N | y |
|     If so, does Claimant view any of the subcontractors' claims as viable? | Y or N | y |
|     Claimant's evaluation of subcontractors' claims | Score 1-10 | 6 |
|     Amount due to subcontractors on viable claims | Dollars | $500,000 |
|     Overhead and profit allowed on subcontractors' claims | Percentage | 10% |
|     ADJUSTED VALUE OF SUBCONTRACTORS' CLAIMS TO CLAIMANT | | $30,000 |
| 10. Disputed versus undisputed portion of claims | | |
|   Known undisputed portion of claim (if none is *known* to be undisputed, enter $0) | | $1,500,000 |
|   Anticipated disputed portion of claim | | $2,288,267 |
|     CLAIM SNAPSHOT | | $3,788,267 |

| Likelihood of Success | Ranking Method | Score |
|---|---|---|
| 1. Nature of project | | |
| Degree of Claimant's expertise (high degree of expertise = 10) | Score 1-10 | 7 |
| 2. Culpability for claimed shortcomings | | |
| Quality of bid | | |
| Profitability (strong = 10) | Score 1-10 | 7 |
| Bid integrity (detailed = 10) | Score 1-10 | 10 |
| Claimant's culpability | | |
| Quality of Claimant's work on project (good = 10) | Score 1-10 | 9 |
| Quality of Claimant's subcontractors (good = 10) | Score 1-10 | 5 |
| Percentage of work performed by subcontractors | Percentage | 80% |
| 3. Likely testifying witnesses for Claimant | | |
| Core claimant employees (usually Project Manager and Foreperson) | | |
| Project Manager | | |
| Employment (remains employed with Claimant, no separation) | Y or N | y |
| Location/commitment to project (within community = 10, opposite end of US = 1) | Score 1-10 | 7 |
| Quality of witness - appears strong along with strong recollection (highest quality = 10) | Score 1-10 | 9 |
| Independent evaluation of credibility (very credible = 10) | Score 1-10 | 9 |
| Second Key Witness | | |
| Employment (remains employed with Claimant, no separation) | Y or N | n |
| Location/commitment to project (within community = 10, opposite end of US = 1) | Score 1-10 | 8 |
| Quality of witness - appears strong along with strong recollection (highest quality = 10) | Score 1-10 | 4 |
| Independent evaluation of credibility (very credible = 10) | Score 1-10 | 10 |
| 4. Third Parties | | |
| Independent supportive third parties (e.g. subcontractor or project manager) (very supportive = 10) | Score 1-10 | 7 |
| Independent critical third parties (e.g. architect) (very critical = 10, not critical = 1) | Score 1-10 | 6 |
| Claimant's leverage on third parties | Score 1-10 | 6 |
| 5. Anticipated opposing party witnesses | | |
| Employment (remains employed by opposing party, no separation) | Y or N | y |
| Location/commitment to project (within community = 10, opposite end of US = 1) | Score 1-10 | 10 |
| Strength of dislike of claimant (strong dislike = 10) | Score 1-10 | 7 |
| 6. Quality of Documentation | | |
| Necessary documents are easily obtained (easy = 10) | Score 1-10 | 10 |
| Quality of notice/demands | | |
| Consistency of position throughout project (consistent = 10) | Score 1-10 | 5 |
| Timeliness of notices (very timely = 10) | Score 1-10 | 7 |
| SUCCESS SCORE | 65.43 | |

| | | | | | Counterclaims that Will be Drawn from Pursuing Claims | Ranking | |
|---|---|---|---|---|---|---|---|
| | | | | | | Method | Score/Value |
| 1. | Impact of filing a claim | | | | | | |
| | A. | Will pursuing a claim draw a counterclaim that otherwise would not be filed? | | | | Y or N | y |
| | | If so, does Claimant view any of the counterclaimant's claims as viable | | | | Y or N | y |
| | | Does Claimant have any legal defenses to counterclaimant's claims | | | | Y or N | n |
| | | Does Claimant have any factual defenses to counterclaimant's claims | | | | Y or N | y |
| | | | Claimant's evaluation of merits of counterclaimant's claims | | | Score 1-10 | 7 |
| | | | | | | | |
| 2. | Value of potential counterclaim (not considering likelihood of success) | | | | | | |
| | A. | Claimant's valuation of counterclaim | | | | Dollars | $100,000 |
| | B. | Counterclaimant's valuation of counterclaim (i.e., last demand) | | | | Dollars | $1,000,000 |
| | | | Weighted value of counterclaim | | | | $280,000 |
| | | | | | | | |
| | | | | COUNTERCLAIM SNAPSHOT | | $ 196,000.00 | |

| Potential for Collection of Recovery | Ranking Method | Score |
|---|---|---|
| 1. Perceived viability of Obligor as primary payor based on research/Client knowledge (solvent with local banks = 10) | Score 1-10 | 5 |
| 2. Nature of Alternative/Secondary payors (fill in yes/no checklist for A, B or C) | | |
|   A. Federal Projects | | |
|     Miller Act Checklist | | |
|       1. Claim filed within one year since furnishing labor or material | Y or N | y |
|       2. Written Notice is given within 90 days of last of labor or furnishing of material | Y or N | y |
|       3. Notice states with substantial accuracy the amount claimed | Y or N | y |
|       4. Notice states with substantial accuracy the name of the party labor or material was furnished | Y or N | y |
|       5. Notice is served by a means that provides written, third-party verification of delivery | Y or N | y |
|   B. State/Local Projects (if Little Miller Act applies, otherwise use Private) | | |
|     Little Miller Act Checklist (confirm relevant law for req'ts beyond gen. conditions below) | | |
|       1. Notice sent to all proper parties | Y or N | |
|       2. Notice was in writing | Y or N | |
|       3. Notice in the form of a sworn statement | Y or N | |
|       4. Notice was given within time requirement | Y or N | |
|       5. Amount in material or labor meets minimum requirement | Y or N | |
|       6. Claim filed within time period required | Y or N | |
|       7. All other Little Miller Act requirements fulfilled | Y or N | |
|   C. Private Contracts | | |
|     Private Bond Requirements | | |
|       1. Payment Bond exists and is paid up | Y or N | |
|       2. Notice Made during Contractual Period, or can be made later | Y or N | |
|       3. Bond Covers Work in Dispute and Amount Sought | Y or N | |
|       4. Any other bond requirements fulfilled | Y or N | |
| COLLECTABILITY SCORE | | 100 |

| Cost Snapshot | | Ranking | |
|---|---|---|---|
| | | Method | |
| A. Nature of Proceedings | | | |
| 1. Arbitration clause | | Y or N | n |
| If no arbitration clause, is there a jury waiver? | | Y or N | y |
| 2. Contract requires mediation as a prerequisite | | Y or N | n |
| | | | |
| B. Venue | | | |
| 1. Location of forum relative to witnesses and site | | Miles | 25 |
| 2. Favorability of venue (highly favorable = 10) | | Score 1-10 | 9 |
| 3. Speed of Docket (fast = 10) | | Score 1-10 | 7 |
| 4. Unusual additional venue costs (Percentage - normally 0%, max 10%) | | Percent | 0.0% |
| | | | |
| C. Discovery | | | |
| 1. Allowance of written discovery | | Y or N | n |
| 2. Allowance of oral discovery | | Y or N | y |
| | | | |
| D. Motion Practice | | | |
| 1. Number of significant or dispositive motions from Claimant | | Number | 2 |
| 2. Number of anticipated significant or dispositive motions from opposition | | Number | 2 |
| | | | |
| E. Experts | | | |
| Outside experts required: | | | |
| Mechanical | | Y or N | n |
| Electrical | | Y or N | y |
| HVAC | | Y or N | n |
| Expert on impact damages | | Y or N | y |
| Accounting/project management/bond issues | | Y or N | n |
| Other experts required | | Number | 0 |
| | | | |
| F. Complexity of Case | | | |
| 1. Number of discrete issues | | Number | 2 |
| 2. Likely counterclaims | | Y or N | y |
| 3. Potential for third-party claims | | Y or N | n |
| | | | |
| | COST SNAPSHOT | $729,241 | |

FIG. 10

| Summary of Analysis | | |
|---|---|---|
| | Matrix Analysis | |
| Claim Value Snapshot | | |
|    Known Undisputed Portion of Claim Snapshot | $1,500,000 | |
|    Believed Disputed Portion of Claim | $2,288,267 | |
|    Success Score | 65.43 | |
|    Adjusted Disputed Portion of Claim | $1,497,156 | |
|    CLAIM VALUE SUBTOTAL | $2,997,156 | |
|    Collectability Score | 100 | |
|    ADJUSTED CLAIM VALUE | $2,997,156 | |
| Drawn Counterclaim Snapshot | ($196,000) | |
| Cost Snapshot | ($729,241) | |
| CLAIM ANALYSIS VALUATION | $ 2,071,914.34 | |
| Other mandatory considerations that have no direct claim analysis impact | | |
| 1. Is the customer relationship so significant that litigation is not a realistic option? | Y or N | n |
| 2. Is there a prevailing party provision regarding attorneys fees and costs? | Y or N | n |
|    a. Is it a "75/25" provision? | Y or N | |
| 3. Are there contractually intervening parties that must be addressed? | Y or N | n |
| 4. What is the reputation of the opponent (e.g. fight but settle at the end) | narrative | settle after a fight |
| OTHER MATERIAL CONSIDERATIONS THAT MAY IMPACT THE CLAIM ANALYSIS: | | |
| 1. Respondent fails to provide proper notice to cure for counterclaim items | | |
| 2. Respondent refuses to clearly articulate its position on damages | | |

FIG. 11

CLAIM EVALUATION METHODS, SYSTEMS, PRODUCTS, AND DATA-STRUCTURES

FIELD OF THE INVENTION

This invention relates to automated data processing systems and, in particular, to an automated data processing system configured to evaluate a potential claim.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Deciding whether or not to proceed with a potential claim is a decision that is worthy of objective analysis. Even in the simplest case, certain factors should be considered before asserting the claim. Unfortunately, these factors are often overlooked, which leads to inconsistent and impulsive decision-making regarding the handling of claims from the initial making of the claim through negotiation, settlement, and litigation or arbitration.

The corporate environment is often no different. Decision makers may fail to effectively analyze a claim before deciding whether or not to assert it. They may become disillusioned or encouraged by reports of inconsistent results for seemingly similar claims. If an improvidently calculated claim is large enough, the decision maker may feel pressured to assert it, regardless of the merits of the claim. Such haphazard decision-making may lead to excessive costs, which, in turn, may prove detrimental, or in a worst-case scenario, fatal to the continued existence of the organization.

BRIEF SUMMARY OF THE INVENTION

Claim evaluation methods, systems, products, and data-structures are described herein. The term "claim" as it is used in this disclosure should be interpreted to mean a demand for something as rightful or due, including not by way of limitation, an assertion of entitlement to benefits or damages under a construction contract. Information relating to a potential claim is used to calculate an estimated claim valuation.

According to one aspect, a method for evaluating a potential claim using a computerized platform is presented. The method comprises the steps of receiving into the computerized platform information relating to a potential claim. Specifically, that information relates to a value of the potential claim, a likelihood of success of the potential claim, and a cost of asserting the potential claim. The method further comprises the steps of calculating an estimated claim valuation based upon the information relating to a potential claim using the computerized platform, and presenting that estimated claim valuation to a user.

According to another aspect, a method for calculating a claim analysis valuation is presented. The method comprises several steps. Disputed and undisputed claim portions are determined. A success score is also determined. A collectability score is determined. A counterclaim value is determined. A cost value is also determined. A claim analysis valuation is then derived from the undisputed claim portion, the disputed claim portion, the success score, the collectability score, the counterclaim value, and the claim value.

According to another aspect, a method for estimating a likely recoverable amount on a claim is presented. The method comprises several steps. Disputed and undisputed portions of a claim are determined by entering first and second sets of information into a software application hosted on a computer-based platform. A likelihood of success in recovering the disputed portion of the claim is estimated by entering a third set of information into the software application. A collectibility score is determined by entering a fourth set of information into the software application. A likely counterclaim amount is estimated by entering a fifth set of information into the software application. A cost amount is also determined by entering a sixth set of information into the software application. A likely recoverable amount is then calculated via the software application by using the undisputed portion, the disputed portion, the likelihood of success, the collectibility score, the counterclaim amount, and the cost amount.

According to another aspect, a computerized system for evaluating a potential claim is presented. The system comprises a memory component for maintaining information relating to a value of the potential claim, a likelihood of success of the potential claim, and a cost of asserting the potential claim. The system also comprises a processor for calculating a claim valuation based upon the information relating to the value of the potential claim, the likelihood of success of the potential claim, and the cost of asserting the potential claim. The system further comprises a memory component for storing the claim valuation.

According to another aspect, a computerized system for evaluating a potential claim is presented. The system comprises means for receiving into the system information relating to the potential claim. This information relates to a value of the potential claim, a likelihood of success of the potential claim, and a cost of asserting the potential claim. The system further comprises means for calculating an estimated claim valuation based upon the information relating to the potential claim and means for presenting the estimated claim valuation to a user.

According to another aspect, a computer software product for evaluating a potential claim is presented. The software product comprises instructions for prompting a user to enter information relating a potential claim. This information relates to a value of the potential claim, a likelihood of success of the potential claim, and a cost of asserting the potential claim. The software product comprises instructions for calculating a claim valuation based upon the information relating to the potential claim. The software product also comprises instructions for displaying the claim valuation to the user.

According to another aspect, a spreadsheet, hosted a computer-based platform, for calculating a likely recoverable amount on a claim is presented. The spreadsheet comprises first and second information entry and calculation sections for determining undisputed and disputed portions of a claim. The spreadsheet comprises a third information entry and calculation section for estimating a likelihood of success in recovering the disputed portion of the claim. The spreadsheet comprises a forth information entry and calculation section for determining a collectibility score. The spreadsheet comprises a fifth information entry and calculation section for estimating a likely counterclaim amount. The spreadsheet comprises a sixth information entry and calculation section for determining a cost amount. The spreadsheet comprises a formula for calculating a likely recoverable amount using the undisputed portion, the disputed portion, the likelihood of success, the collectibility score, the counterclaim amount, and the cost amount.

According to another aspect, a data structure is presented. The data structure comprises a first field comprising data representing a disputed claim amount, a second field comprising data representing a likelihood of success score, and a third field comprising data representing a potential claim valuation. The potential claim valuation is derived at least from the first and second fields.

According to another aspect, a data structure is presented. The data structure comprises: (1) a first field containing data representing an undisputed claim portion and a disputed claim portion; (2) a second field containing data representing a success score; (3) a third field containing data representing an adjusted disputed claim portion derived from the first field and the second field; (4) a fourth field containing data representing a collectability score; (5) a fifth field containing data representing an adjusted claim value derived from the first field, the third field and the fourth field; (6) a sixth field containing data representing a counterclaim value; (7) a seventh field containing data representing a cost value; and (8) an eight field containing data representing a claim analysis valuation derived from the fifth field, the sixth field and the seventh field.

According to another aspect, a data structure is presented. The data structure comprises: (1) a subcontractor field containing data representing an adjusted value of subcontractor's claims; (2) a lost profit field containing data representing an adjusted loft profit damages; (3) an impact damages field containing data representing an adjusted impact damages; (4) a contract claim value field containing data representing an adjusted contract claim value; (5) a claim snapshot field containing data derived from the subcontractor field, the lost profit field, the impact damages field and the contract claim value field; (6) a success category field containing data representing a plurality of success related categories; (7) a success category success field containing data representing a success score for each success related category; (8) a success category weighting factor field containing data representing a weighting factor for each success related category; (9) a success score field containing data derived from the success category field, the success category success field and the success category weighting factor field; (10) an impact of filing a claim field containing data pertaining to the possibility of a counterclaim; (11) an evaluation of counterclaim field containing data pertaining to the merits of a counterclaim; (12) a counterclaim potential value field containing data pertaining to the potential value of a counterclaim; (13) a counterclaim value field containing data derived from the impact of filing a claim field, the evaluation of counterclaim field and the counterclaim potential value field; (14) a federal requirements field containing data pertaining to federal collection requirements; (15) a state requirements field containing data pertaining to state collection requirements; (16) a private bond field containing data pertaining to private bond collection requirements; (17) a perceived payment field containing data pertaining to a perceived ability of obligor as primary payor; (18) a collectability score field containing data derived from the federal requirements field, the state requirements field, the private bond field and the perceived payment field; (19) a litigation category field containing data representing a plurality of litigation related categories; (20) a litigation category rank field containing data representing a rank for each litigation related category; (21) a litigation category weighting factor field containing data representing a weighting factor for each litigation related category; (22) a cost value field containing data derived from the litigation category field, the litigation category rank field, the litigation category weighting factor field, and the claim snapshot field; (23) a claim analysis valuation field derived from the claim snapshot field, the success score field, the counterclaim value field, the collectability score field, and the cost value field.

BRIEF DESCRIPTION OF THE SEVERAL VIEWS OF THE DRAWINGS

FIG. 6A is a schematic representation of an embodiment of an information entry and calculation section of a spreadsheet for determining a claim snapshot amount according to the present invention.

FIG. 6B is a schematic representation of an embodiment of an information entry and calculation section of a spreadsheet for determining a claim snapshot amount according to the present invention.

FIG. 7 is a schematic representation of an embodiment of an information entry and calculation section of a spreadsheet for determining a success score according to the present invention.

FIG. 8 is a schematic representation of an embodiment of an information entry and calculation section of a spreadsheet for determining a counterclaim snapshot amount according to the present invention.

FIG. 9 is a schematic representation of an embodiment of an information entry and calculation section of a spreadsheet for determining a collectibility score according to the present invention.

FIG. 10 is a schematic representation of an embodiment of an information entry and calculation section of a spreadsheet for determining cost snapshot amount according to the present invention.

FIG. 11 is a schematic representation of an embodiment of a calculation section of a spreadsheet for determining a claim analysis valuation according to the present invention.

DETAILED DESCRIPTION OF THE INVENTION

The claim evaluation methods, systems, products, and data-structures described herein have been implemented using a spreadsheet software application such as MICROSOFT EXCEL 2000 and appropriate hardware. The invention is described herein accordingly. However, it should be clearly understood that the present invention could be implemented in a number of alternative configurations. For example, the same concepts and logic could be embodied as a computer program product written in C or C++. As another example, these same concepts and logic could also be embodied as a web-based system accessible via the Internet. These alternative embodiments should be construed as being within the scope of the invention, according to the claims. Further, some embodiments disclosed below are described in the context of evaluating construction related breach of contract claims. It should be clearly understood that the present invention could be readily adapted for use with other types of claims. Such variations should also be considered within the scope of this invention.

Figure 1:
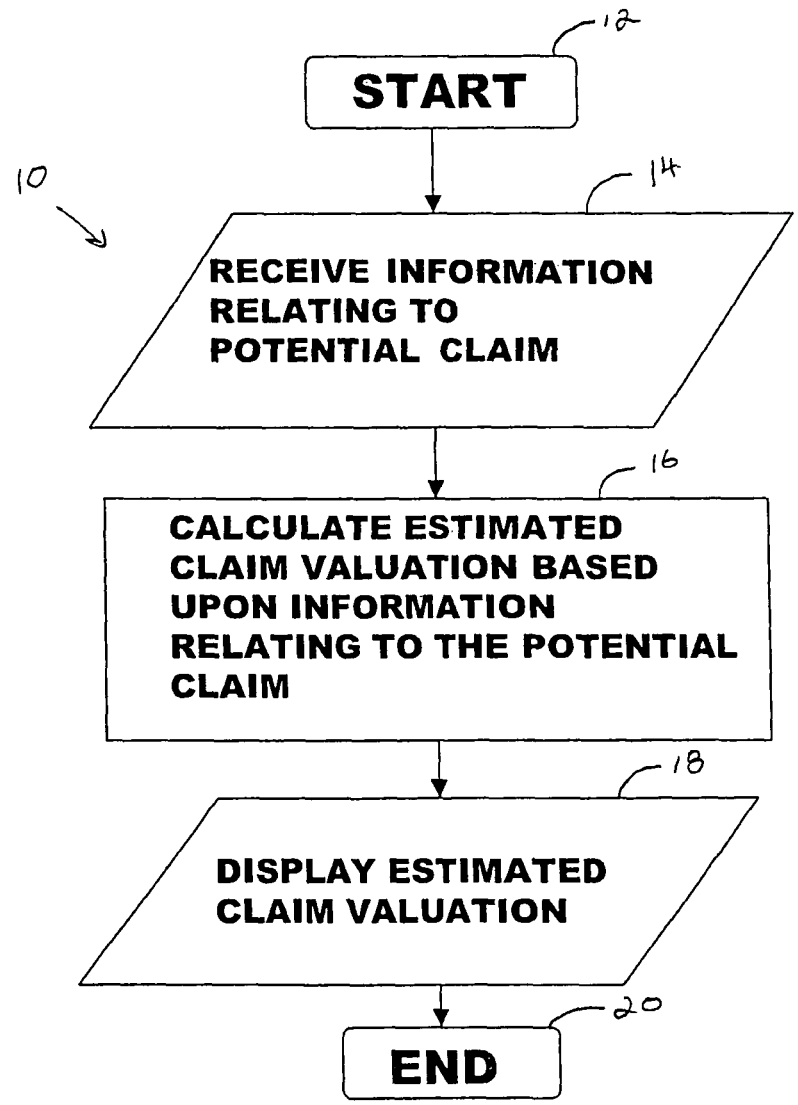
FIG. 1 is a schematic representation of an embodiment of a method for evaluating a potential claim according to the present invention.

FIG. 1 is a schematic representation of an embodiment of a method 10 for evaluating a potential claim using a computerized platform. After the method 10 is initialized 12, information relating to a potential claim is received 14 into the computerized platform. The information relating to the potential claim is then used to calculate 16 an estimated claim valuation. Once calculated, the estimated claim valuation is displayed 18 to a user, and the method 10 terminates 20.

Figure 2:
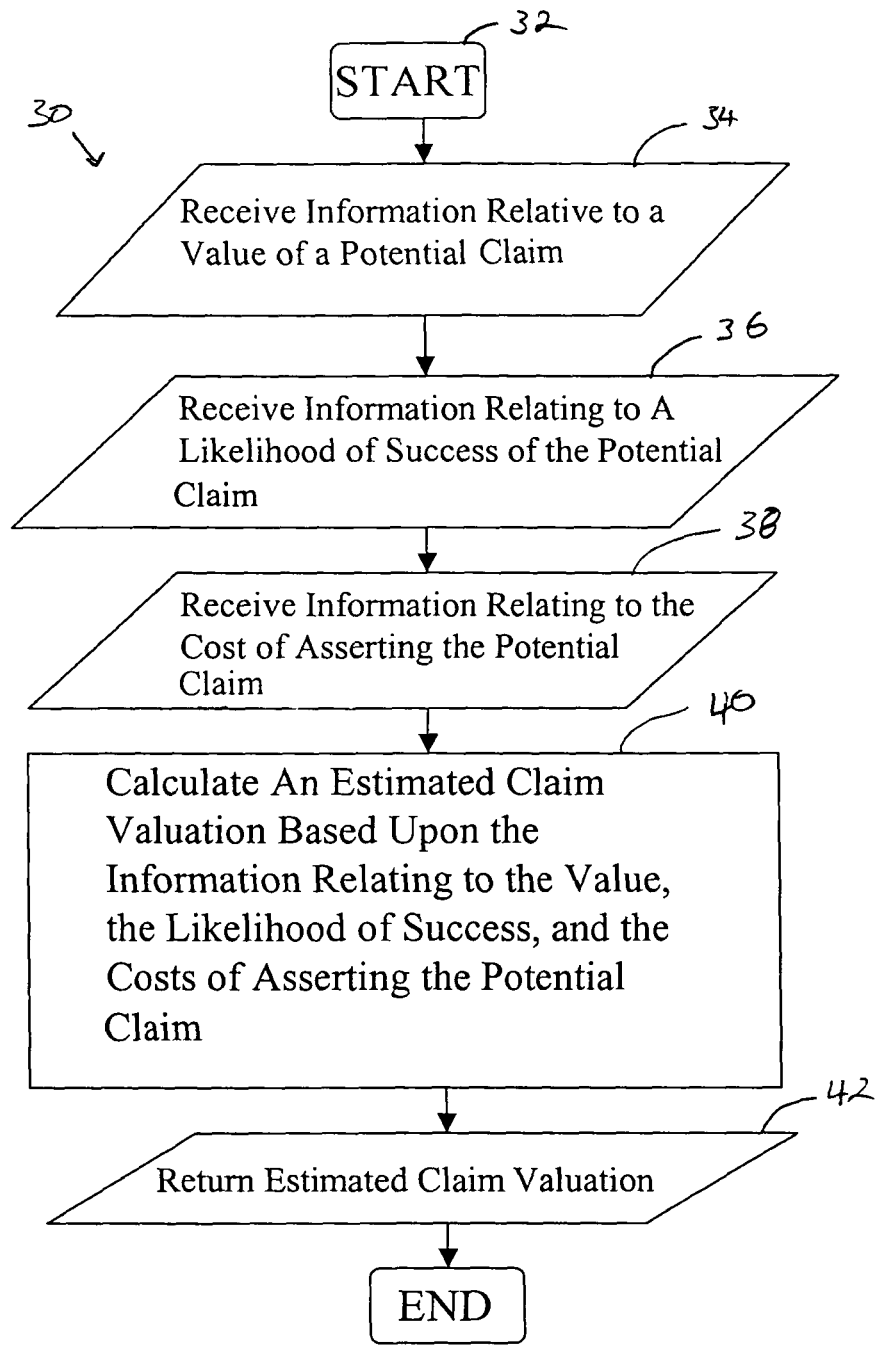
FIG. 2 is a schematic representation of an embodiment of a method for evaluating a potential claim according to the present invention.

FIG. 2 is a schematic representation of an embodiment of a method 30 for evaluating a potential claim using a computerized platform. After the method 30 is initialized 32, information relating to the value of a potential claim is received 34 into the computerized platform. This value information may be categorized in a variety of ways. For example, in the current embodiment, the information is organized into several categories including: (1) Base contract and all approved change orders; (2) Pending/unapproved/disputed change orders; (3) Margin; (4) Total job cost; (5) Project retention; (6) Amounts paid and outstanding by contract; (7) Impact damages; (8) Lost profits; and, (9) Subcontract Work. The information in these categories is used to estimate undisputed and disputed portions of the value of the claim. When combined, these portions represent the total gross claim value.

Information relating to a likelihood of success of the potential claim is also received 36 into the computerized platform. This information also may relate to a variety of categories including: (1) Nature of the project; (2) Culpability for claimed shortcomings; (3) Likely testifying witnesses for Claimant; (4) Third Parties; (5) Anticipated opposing party witnesses; and, (6) Quality of documentation. The information collected in these categories is used in calculating a success score.

Information relating to the cost of asserting the potential claim is also received 38 into the computerized platform. Many factors are considered in accessing the potential cost of asserting a claim. These factors may relate to a variety of categories including: (1) Nature of Proceedings; (2) Venue; (3) Discovery; (4) Motion Practice; (5) Experts; and, (6) Complexity of Case. The information collected in these categories is used to calculate a cost value.

Once all of this information is received 34, 36, 38 into the computerized platform, it is used to calculate 40 an estimated claim valuation. The calculation step involves several sub-steps. In the present invention, the disputed portion of the claim is multiplied by the success core to calculate an adjusted disputed portion. The undisputed portion of the claim is then added to the adjusted disputed portion to calculate a claim value subtotal. The cost value is then subtracted from this claim value subtotal to calculate the estimated claim valuation. These calculations are represented by the following equation:

$$EstimatedClaimValuation = UndisputedClaimPortion + (DisputedClaimPortion * SuccessScore) - CostValue$$

Different types of claims may require different calculations. For example, some situations may warrant multiplying the total gross claim value by the success score. These alternative methods for calculating an estimated claim valuation should be construed as being within the scope of the invention. After the estimated claim valuation is calculated 40, it is returned 42 to the user and the method 30 terminates.

Figure 3:
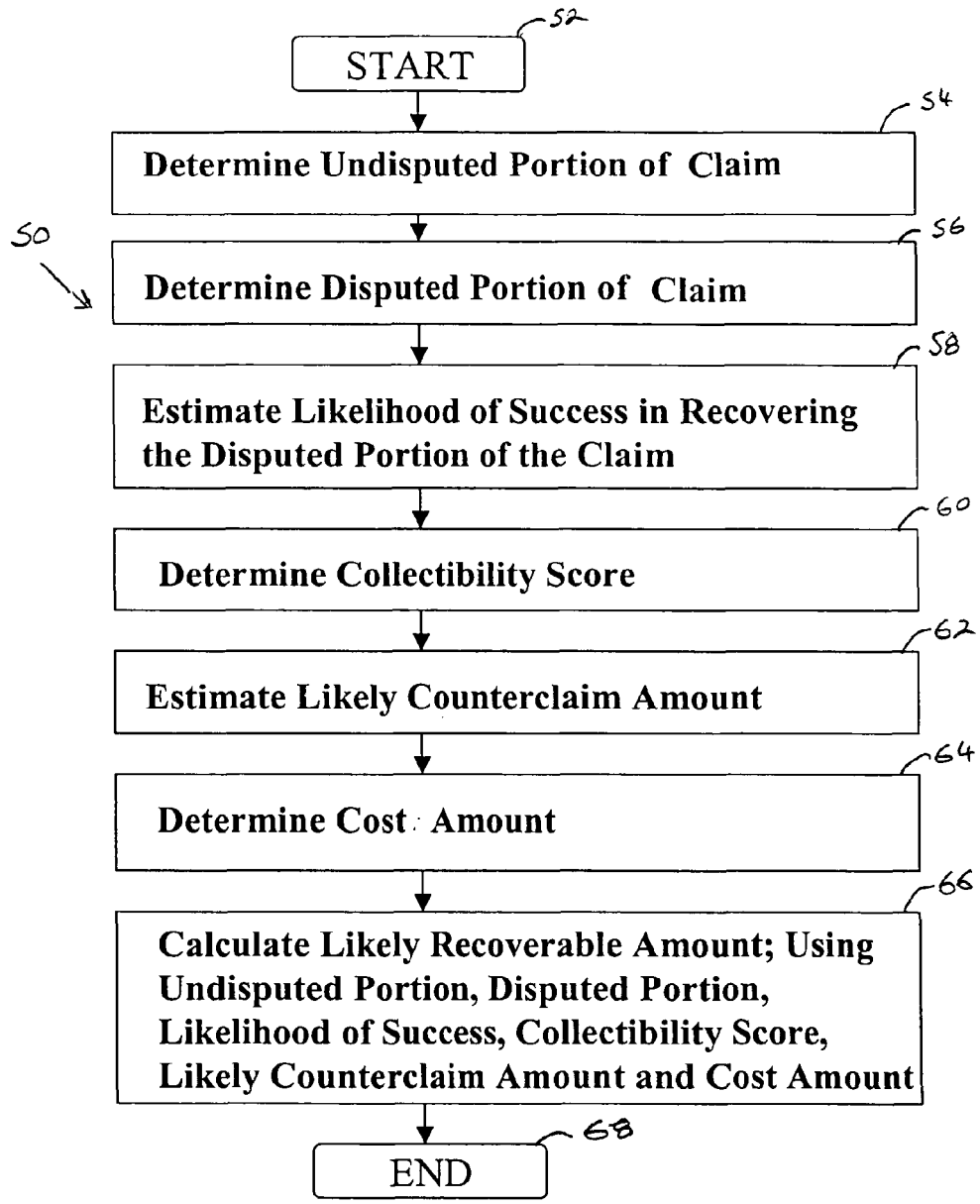
FIG. 3 is a schematic representation of an embodiment of a method for estimating a likely recoverable amount on a claim according to the present invention.

FIG. 3 is a schematic representation of an embodiment of a method 50 for estimating a likely recoverable amount on a claim. After initiation 52, several steps are preformed. Disputed and undisputed portions of a claim are determined 54 & 56 by entering first and second sets of information into a software application hosted on a computer-based platform. A likelihood of success in recovering the disputed portion of the claim is estimated 58 by entering a third set of information. A collectibility score is determined 60 by entering a fourth set of information. A likely counterclaim amount is estimated 62 by entering a fifth set of information. A cost amount is also determined 64 by entering a sixth set of information into the software application.

After all of these sub-processes are performed, a likely recoverable amount is calculated 66. This calculation 66 takes into account the undisputed portion, the disputed portion, the likelihood of success, the collectibility score, the counterclaim amount, and the cost amount. In the present invention, this calculation involves several steps. Specifically, the disputed portion of the claim is multiplied by the likelihood of success to calculate an adjusted disputed portion. The undisputed portion of the claim is then added to the adjusted disputed portion to calculate a claim value subtotal. The claim value subtotal is then multiplied by the collectibility score to calculate an adjusted claim value. The counterclaim amount and cost amount are then subtracted from the adjusted claim value to calculate the likely recoverable amount. These calculations are represented by the following equation:

$$LikelyRecoverableAmount = ((UndisputedPortion + (DisputedPortion * LikelihoodOfSuccess)) * CollectibilityScore) - (CounterClaimAmount + CostValue)$$

After the likely recoverable amount is calculated 66, the method terminates 68.

Figure 4:
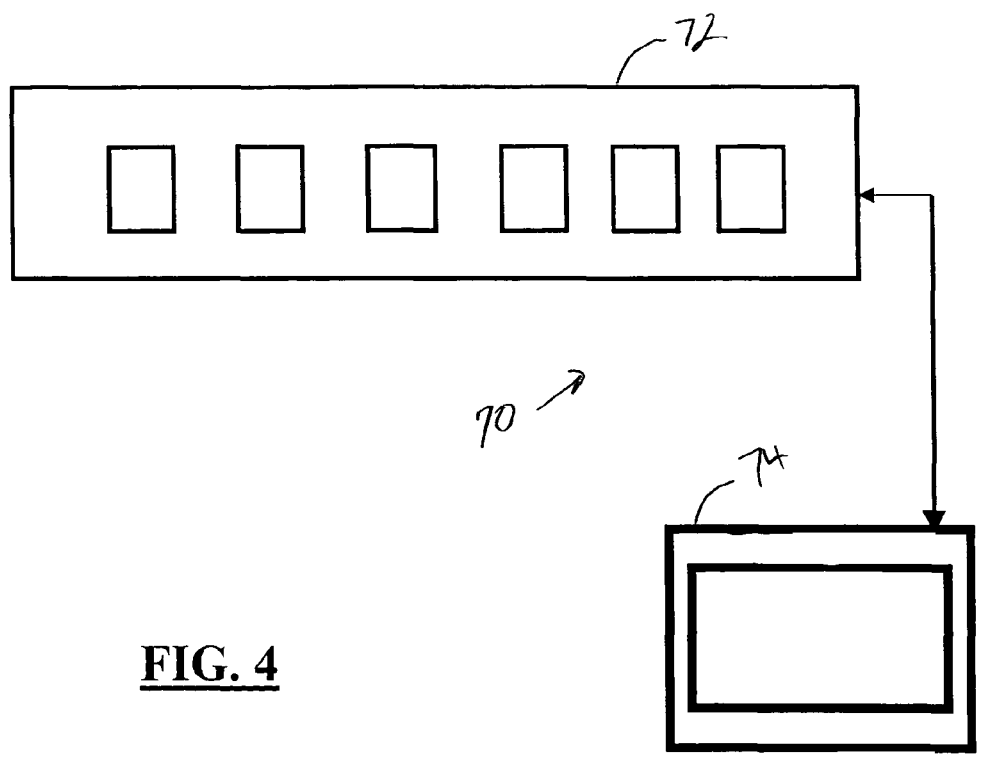
FIG. 4 is a schematic representation of an embodiment of a computerized system for evaluating a potential claim according to the present invention.

FIG. 4 is a schematic representation of an embodiment of a computerized system 70 for evaluating a potential claim according to the present invention. The system 70 comprises a memory component 72 for maintaining information relating to a value of the potential claim, a likelihood of success of the potential claim, and a cost of asserting the potential claim. The system also comprises a processor 74 for calculating a claim valuation based upon the information relating to the value of the potential claim, the likelihood of success of the potential claim, and the cost of asserting the potential claim. The system further comprises a memory component 72 for storing the claim valuation.

Figure 5:
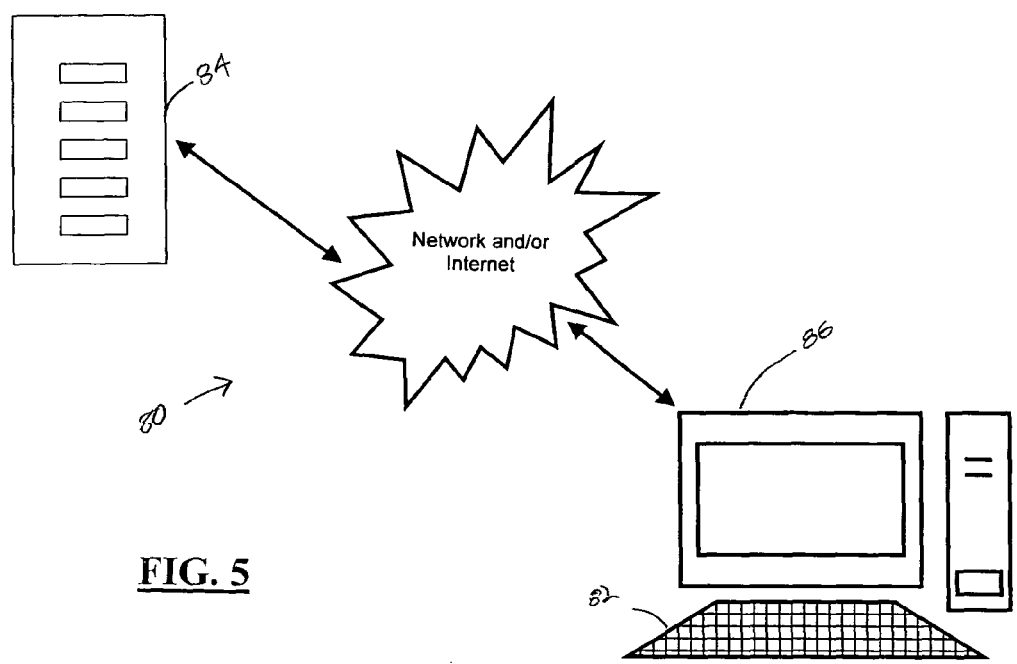
FIG. 5 is a schematic representation of an embodiment of a computerized system for evaluating a potential claim according to the present invention.
Figure 12:
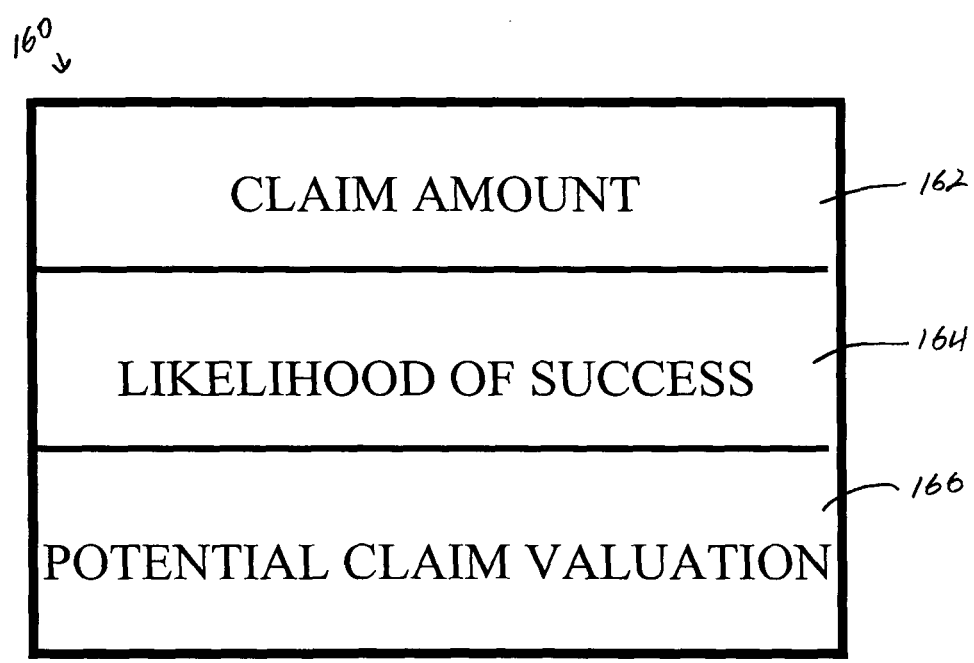
FIG. 12 is a schematic representation of an embodiment of a data structure comprising data representing a potential claim valuation according to the present invention.

FIG. 5 is a schematic representation of an embodiment of a computerized system 80 for evaluating a potential claim according to the present invention. The system 80 comprises means for receiving 82 information relating to the potential claim. This information relates to a value of the potential claim, a likelihood of success of the potential claim, and a cost of asserting the potential claim. The system further comprises means for calculating 84 an estimated claim valuation based upon the information relating to the potential claim and means for presenting 86 the estimated claim valuation to a user.

The present invention may also be embodied as a computer software product for evaluating a potential claim according to the present invention. The software product comprises instructions for prompting a user to enter information relating a potential claim. This information relates to a value of the potential claim, a likelihood of success of the potential claim, and a cost of asserting the potential claim. The software product comprises instructions for calculating a claim valuation based upon the information relating to the potential claim. The software product also comprises instructions for displaying the claim valuation to the user.

FIGS. 6A-11 are schematic representations of an embodiment of a spreadsheet 100 for calculating a likely recoverable amount on a claim. In this particular embodiment of the invention, the spreadsheet comprises six worksheets. The first is a claim worksheet 102 (FIGS. 6A & B) into which information relating to disputed and undisputed portions of a claim may be entered. The second is a success worksheet 110 (FIG. 7) into which information relating to a likelihood of success in recovering the disputed portion of the claim may be entered. The third is a counterclaim worksheet 120 (FIG. 8) into which information relating to potential counterclaims may be entered. The fourth is a collectibility worksheet 130 (FIG. 9) into which information relating to the collectibility of a judgment may be entered. The fifth worksheet is a cost worksheet 140 (FIG. 10) into which information relating to the cost of asserting a claim may be entered. Finally, the sixth is a summary worksheet 150 (FIG. 11) that reflects information from the other five worksheets. For ease of discussion, the remaining disclosure of this particular embodiment of the invention is organized according to these six worksheets.

Claim Worksheet

Referring now to FIGS. 6A & 6B, this particular section of the spreadsheet comprises an information entry and calculation section 102 for determining the total gross claim value or claim snapshot amount 104. In the current embodiment, information is organized into several categories including: (1) Base contract and all approved change orders; (2) Pending/unapproved/disputed change orders; (3) Margin; (4) Total job cost; (5) Project retention; (6) Amounts paid and outstanding by contract; (7) Impact damages; (8) Lost profits; and (9) Subcontract work.

The information in the base contract and all approved change orders category comprises: (1) the base contract amount; (2) the percentage of the base contract to be completed by the time of pursuing the claim; (3) any approved change order amount; and, (4) the percentage of the total approved change orders to be completed by the time of pursuing the claim. The base contract amount is multiplied by the percentage of the base contract to calculate a base contract subtotal. Similarly, any approved change order amount is multiplied by the percentage of the total approved change orders to calculate an approved change order subtotal.

The information in the pending/unapproved/disputed change orders category comprises the total value of pending change order work to be completed by the time of pursuing the claim along with several reduction factors. These reduction factors include: (1) whether or not there is a waiver provision in the contract; (2) the quality of documentation of these change orders; (3) the availability of witnesses with respect to undocumented or poorly documented change orders; and (4) whether or not there is written acceptance of these particular change orders. This information is used to calculate an adjusted pending change order subtotal. In the current embodiment, the waiver provision and written acceptance reduction factors are yes/no selections while the documentation quality and witness availability reduction factors are assigned a numerical value. Several calculations are applied to the reduction factors in order to calculate a reduction factor subtotal.

First, a subcategory weight is calculated. If the documentation quality value is less than or equal to seven, then that value is averaged with the witness availability value to calculate the subcategory weight. If, however, the documentation quality value is greater than seven, then the subcategory weight equals the documentation quality value. Second, a subcategory result is determined. If there is a waiver provision in the contract, then this subcategory result equals zero. If there is there is written acceptance of the pending change orders, then the subcategory result equals ten. If there is both a waiver provision in the contract and there is written acceptance of the pending change orders, then the subcategory result equals zero. If there is neither a waiver provision in the contract, nor written acceptance of the pending change orders, then the subcategory result equals the subcategory weight. The adjusted pending change order subtotal is calculated by multiplying the total value of pending change order work by a percentage reflecting the subcategory result.

From the above information, two values are calculated: (1) a maximum contract claim value, and (2) an adjusted contract claim value. The maximum contract claim value is the sum of the base contract amount, the approved change order amount, and the total value of pending change order work to be completed by the time of pursuing the claim. The adjusted contract claim value is the sum of the base contract subtotal, the approved change order subtotal and the adjusted pending change order subtotal.

The information in the margin category comprises: (1) the anticipated percentage margin on contract work and (2) the anticipated percentage on change order work. The anticipated percentage margin on contract work is multiplied by the base contract amount to yield the anticipated profit on work attributable to the contract. Similarly, the anticipated percentage margin on change order work is multiplied by both (1) total value of pending change order work to be completed by the time of pursuing the claim, and, (2) any approved change order amount to yield the anticipated profit on work attributable to change orders. This amount is added to the anticipated profit on work attributable to the contract to yield a predicted margin on project.

The information in the total job cost category comprises: (1) the current total job cost, and, (2) the estimated total job cost at completion. The estimated total job cost is subtracted from the sum of (1) the base contract subtotal (from the base contract and all approved change orders category), and (2) the approved change order subtotal. In addition, the job cost category calculates the amount by which completed and pending work exceeds the estimated job costs at completion by comparing the sum of the base contract amount multiplied by the percentage of work completed and the approved change order amount multiplied by the percentage of change order work completed and subtracting the estimated job cost at completion.

The information in the project retention category comprises: (1) the percentage amount of retention required under the contract at issue and (2) the percentage amount of retention required under local law (if determinative). From these two amounts, a maximum retention amount is calculated by multiplying the higher of the two percentage amounts by the sum of (1) the base contract subtotal and (2) the total value of pending change order work to be completed by the time of pursuing the claim.

The information in the amounts paid and outstanding by contract category comprises: (1) the total dollar amount paid to date for the base contract, approved change orders, and pending change orders; and (2) conceded deductions. From these two amounts, an adjusted amount paid to date amount is calculated by subtracting conceded deductions from the total dollar amount paid to date. The adjusted amount paid to date is then used to calculate both a maximum and a likely contractual outstanding amount. The maximum contractual outstanding amount is calculated by subtracting the adjusted paid to date amount from the maximum contract claim value. Similarly, the likely contractual outstanding amount is calculated by subtracting the adjusted paid to date amount from the adjusted contract value.

The information in the impact damages category may be further categorized into two major subcategories: (1) contractual provisions regarding impact damages; and (2) elements of impact damages. The information in the contractual provisions regarding impact damages category comprises: (1) whether there is an exculpatory clause barring impact claims; (2) whether there is a lien waiver barring impact claims; (3) whether there is a notice provision that can no longer be satisfied; and, (4) whether there is a force majure clause barring impact claims. In the current embodiment, this information takes the form of yes/no/disputed selections. If any of this information is disputed, a present likelihood of success evaluation is made. This evaluation represents the users current opinion of the likelihood of success with respect to that particular issue. This information is used to calculate an impact damage contractual barrier score. If any of the selections equal yes, then the impact damage contractual barrier equals zero. If all of the selections equal no, then the impact damage contractual barrier score equals ten. If none of the selections equal yes, but not all of the selections equal no, then the impact damage contractual barrier score equals the present likelihood of success evaluation.

The elements of impact damages subcategory comprises information relating to: (1) conventional impact damages; (2) lost labor productivity; (3) Eichleay Damages; and (4) impact damage reduction factors. In the current embodiment, conventional impact damages include: (1) extended general conditions (non-labor external costs of remaining on site); (2) additional labor costs and overtime staffing (extra personnel and extra hours); (3) additional equipment costs required to accelerate; and, (4) changed/unknown conditions (in addition to extra labor and/or equipment). These amounts are added together to yield a conventional impact damages subtotal.

Lost labor productivity includes: (1) an amount reflecting labor take off during the impact; (2) the number of days worked per week during the impacted phase; and (3) the number of hours worked per day during the impacted phase. From this information, a lost productivity damages subtotal is calculated by comparing the number of days and hours worked against Dept. of Labor Bulletin No. 917 chart to determine the loss of productivity percentage and then multiplying this figure against the labor take off during the impacted period.

Unabsorbed overhead damages for project delay ("Eichleay Damages") include: (1) information relating to prima facie issues such as (a) whether the potential claimant was on "standby" during delay, and (b) whether the potential claimant could take on other projects while on standby; (2) the name of the relevant office; (3) the monthly internal overhead for the relevant office; (4) the monthly billings for the relevant office; and (5) the monthly billings for the project; (6) the percentage of overhead attributable to the project; and, (7) the number of extended project days. From this information, an Eichleay Damages subtotal is calculated. In the present embodiment, this calculation includes the following steps. The number of extended days are divided by 30 to approximate the number of extended months. The percentage of overhead attributable to the project is multiplied by the monthly internal overhead for the relevant office. That product is then multiplied by the approximated number of extended months. If the claimant was on standby, then the total of this calculation is revealed, otherwise the total of this calculation equals zero.

The conventional impact damages subtotal, lost productivity damages subtotal, and Eichleay Damages subtotal are then added together to yield a subtotal of impact damages. This subtotal may then be reduced depending upon the impact damage reduction factors. In the current embodiment, impact damage reduction factors comprise information relating to "measured mile analysis". Specifically, the information comprises: (1) whether or not the ability to calculate measured mile on comparable project work exists, and, (2) a numerical value representing the degree to which measured mile is representative. From this information, an impact damages reduction factor weight is calculated. If the ability to calculate measured mile on comparable project work does exist, then the impact damages reduction factor weight is equal to the greater of 0.5 or the numerical value representing the degree to which measured mile is representative. If the ability to calculate measure mile on comparable project work does not exist, then the impact damages reduction factor is 0.5. Next, a reduced impact damages value is calculated by multiplying the subtotal of impact damages by the impact damages reduction factor. Finally, an adjusted impact damages amount is calculated by multiplying the reduced impact damages by the impact damage contractual barrier score.

The information in the lost profits category may be further categorized into three major subcategories: (1) lost profits barriers; (2) lost profits claimed and reduction factors; and (3) impact and lost profits damage crosscheck. The information in the lost profits barriers category comprises: (1) whether the claimant can clearly establish that it had new projects that it was prevented from performing; (2) whether the contract contains an exculpatory clause barring lost profit claims; (3) whether the contract contains a lien waiver barring lost profits claims; (4) whether the contract contains a notice provision for lost profits which can no longer be satisfied; and (5) whether the contract contains a force majure clause barring lost profits claims. In the current embodiment, this information takes the form of yes/no/disputed selections. If any of this information is disputed, a present likelihood of success evaluation is made. This evaluation represents the users current opinion of the likelihood of success with respect to that particular issue. This information is used to calculate a lost profit contractual barrier score using the following rules. If the claimant cannot clearly establish that it had new projects that it was prevented from performing, or if any of the remaining selections (exculpatory clause, lien waiver, notice provision, force majure clause) equal yes, then the lost profit contractual barrier score equals zero. If any of the selections (clearly establish new projects, exculpatory clause, lien waiver, notice provision, force majure clause) are disputed, then the contractual barrier score equals the present likelihood of success. Otherwise, the contractual barrier score equals ten.

The information in the lost profits claimed and reduction factors category comprises: (1) losses to claimant for inability to perform alternative work; (2) quality of documentation; and (3) quality of witness testimony on lost profits. The documentation value is multiplied by three and then added the witness testimony value. This figure is then divided by 3 to yield a reduction factors score. The claimant loss amount for inability to perform alternative work is multiplied by the reduction factors score to yield an adjusted lost profits damages amount.

The information in the impact and lost profits damage crosscheck category comprises: (1) the amount the project is "underwater" assuming no profit, and (2) the amount the project is "underwater" assuming anticipated profit. The amount the project is underwater assuming no profit is calculated by subtracting the estimated total job cost at completion from the adjusted amount paid to date. The amount the project is underwater assuming anticipated profit is calculated by first adding the estimated total job cost at completion and the predicted margin on project, and then subtracting that amount from the adjusted amount paid to date.

The information in the subcontract work category relates to an evaluation of the likelihood of subcontractors pursuing claims, and comprises: (1) whether or not any of the subcontractors intend to pursue claims; and if so, (2) whether the claimant views any of the subcontractors' claims as viable; (3) an evaluation of the subcontractors' claims; (4) amount due to subcontractors on viable claims; and, (5) the overhead and profit allowed on subcontractors' claims. The determinations regarding subcontractor intent and claim viability are represented by yes/no selections. The claim evaluation is assigned a numerical value. These three pieces of information are used to calculate a subcontract score using the following rules. If either the determination regarding subcontractor intent or the determination regarding claim viability equal no, the subcontract score equals zero. Otherwise, the subcontract score equals the claim evaluation. The amount due to subcontractors on viable claims is multiplied by the overhead and profit allowed on subcontractors' claims, the product of which is then multiplied by subcontract score to yield an adjusted value of subcontractors' claims to claimant amount.

From the preceding information, a claim snapshot amount is calculated. This amount represents the sum of (1) the likely contractual outstanding amount; (2) the adjusted impact damages amount; (3) the adjusted lost profits damages amount; and (4) the adjusted value of subcontractors' claims to claimant amount. The current embodiment of the invention also comprises an amount representing the known undisputed portion of claim. This amount may be subtracted from the claim snapshot value to yield an anticipated disputed portion of the claim.

Success Worksheet

FIG. 7 shows a section of the spreadsheet 100 that comprises an information entry and calculation section 110 for estimating a likelihood of success in recovering the disputed portion of the claim. In the current embodiment, the information is organized into several categories including: (1) the nature of the project; (2) culpability for claimed shortcomings; (3) likely testifying witnesses for claimant; (4) third parties; (5) anticipated opposing party witnesses; and (6) quality of documentation.

The information in the nature of the project category comprises the degree of the claimant's experience as reflected by a numerical ranking or score from one to ten. From this first score a project category score is calculated by multiplying the first score by a category weight. In this embodiment, the project category weight equals ten percent.

The information in the culpability for claimed shortcomings category may be further categorized into to two subcategories: (1) the quality of the bid, and (2) the claimant's culpability. The information in the quality of the bid category comprises: (1) the profitability of the bid as reflected by a numerical ranking or score; and (2) the bid integrity as reflected by a numerical ranking or score. These two scores are averaged to calculate a quality resulting score. The information in the claimant's culpability category comprises: (1) the quality of the claimant's work as reflected by a numerical ranking or score; (2) the quality of the claimant's subcontractors as reflected by a numerical ranking or score; and, (3) the percentage of work performed by the subcontractors. From this information, a culpability resulting score is calculated. First, the subcontractor quality score is multiplied by the percentage of work performed by the subcontractors to yield a first product. Next, the percentage of work performed by the subcontractors is subtracted from 1 to yield a second percentage. Finally, the first product is added to the product of the work quality score multiplied by the second percentage. Next, a culpability category score is calculated. First, the quality resulting score and the culpability resulting score are averaged. That average is then multiplied by a category weight. In this embodiment, the culpability category weight is 22.5%.

The information in the likely testifying witnesses for claimant category may be further categorized into two subcategories: information relating to (1) the project manager, and (2) a second key witness. The type of information in both of these categories is identical and as such, only the information in the project manager category is discussed. That information comprises: (1) whether the individual remains employed by the claimant; (2) that individuals geographic location relative to the project; (3) the apparent quality of the witness and her/her recollection; and (4) an independent evaluation of credibility. The determination whether the individual remains employed by the claimant is a yes/no selection, while numerical rankings or scores from one to ten reflect the remaining information. From this information, a project manager score is calculated according to the following rules. If the individual remains employed by the claimant, then the project manager score is equal to the average of the remaining numerical scores. If the individual is not employed by the claimant, then the project manager score is equal to the product of the average of the remaining score multiplied by 0.66. As indicated above, this same calculation is made with respect to any information regarding a second key witness to yield a second key witness score. Next, a likely testifying witness category score is calculated by first averaging the project manager score with the second key witness score. That average is then multiplied by a category weight. In this embodiment, the witness category weight is 20%.

The information in the third parties category comprises numerical rankings or scores representing: (1) independent supportive third parties; (2) independent critical third parties; and (3) the claimants leverage on third parties. From this information, a third parties category score is calculated as follows. First a resulting score is calculated. If the leverage score is greater than six and the average of the supportive and critical scores is less than nine, then the resulting score equals that average (average of supportive and critical scores) plus one. If the leverage score is less than or equal to six and/or the average of the supportive and critical scores is greater than nine, then the resulting score equals that average. The third parties category score is calculated by multiplying the resulting score by a category weight. In this embodiment, the third party category weight is 10%

The information in the anticipated opposing party witnesses category comprises: (1) the employment status with respect to the opposing party; (2) the location of the opposing witness with respect to the project; and (3) the apparent dislike of the claimant by the opposing witness. The determination as to witness employment status with respect to the opposing party is a yes/no selection while numerical rankings represent the remaining information. From this information, an anticipated opposing party witnesses category score is calculated. First, an initial score is calculated. If the witness is still employed by the opposing party, then the initial score equals the average of the location and dislike scores. If the witness is not employed by the opposing party, then the initial score equals the product of the average of the location and dislike scores multiplied by 0.66. This initial score is then used to calculate a resulting score. If the result of eleven minus the initial score equals greater than ten, then the resulting score equals ten. Otherwise, the resulting score equals the result of eleven minus the initial score. The anticipated opposing party witnesses category score equals the resulting score multiplied by a category weight. In this embodiment, the opposing witness category weight is 10%.

The information in the quality of documentation category comprises numerical rankings or scores representing: (1) whether necessary documents can be easily obtained; (2) the consistency of a position or positions throughout the project; and (3) the timeliness of any notices. From this information, a quality of documentation category score is calculated by first averaging these three numerical scores, and multiplying that average by a category weight. In this embodiment, the documentation category weight is 27.5%.

From the preceding information, a success score is calculated. This score represents the sum of (1) the project category score, (2) the culpability category score, (3) the likely testifying witness category score, (4) the third parties category score, (5) the anticipated opposing party witnesses category score, and (6) the quality of documentation category score.

Counterclaim Worksheet

FIG. 8 shows a section of the spreadsheet 100 that comprises an information entry and calculation section 120 for estimating a likely counterclaim amount 122. In the current embodiment, information is organized into two categories: (1) the impact of filing a claim; and (2) the value of potential counterclaims. The information in the impact of filing a claim category comprises: (1) a determination of whether pursuing a claim will draw any counterclaims that otherwise would not be filed; (2) a determination whether the claimant views any of the counterclaims as viable; (3) a determination whether the claimant has any defenses to the counterclaims; (4) a determination whether the claimant has any factual defenses to the counterclaims; and (5) an evaluation of the merits of the counterclaims. A numerical ranking or score from one and ten represents the evaluation of the merits of the counterclaims, while the remaining determinations are yes/no selections. From this information, an impact subcategory weight is calculated as follows. If the either of the determinations regarding whether pursuing a claim will draw counterclaims or whether any such counterclaims are perceived as viable equals no, then the impact subcategory weight equals zero. If both of these determinations equals yes, then the impact subcategory weight equals the evaluation numerical score.

The value of potential counterclaims category comprises the following information: (1) the claimant's valuation of any potential counterclaims, and (2) the counterclaimant's valuation of any potential counterclaims. From this information, a weighted value of the counterclaims is calculated. In the current embodiment, the claimant's valuation is multiplied by four, added to the counterclaimant's valuation, the total of which is then divided by five. This weighted value of potential counterclaims is then multiplied by the impact subcategory weight to yield a counterclaim snapshot amount.

Collectibility Worksheet

FIG. 9 shows a section of the spreadsheet 100 that comprises an information entry and calculation section 130 for determining a collectibility score 132. The information is organized into several categories including (1) the perceived viability of the potential Obligor as primary payor, and (2) the nature of alternative and secondary payors. A numerical ranking or score from one to ten represents the viability of the potential Obligor as primary payor.

The information in the nature of alternative and secondary payors category is further organized into the following subcategories: (1) federal projects; (2) state and local projects; and (3) private contracts. In the current embodiment, all of this information takes the form of yes/no selections. The information in the federal projects category represents Miller Act checklist items including: (1) whether the claim has been or would be filed within one year since furnishing labor or materials; (2) whether written notice is/has been given within 90 days of last of labor or furnishing of material; (3) whether the notice states with substantial accuracy the amount claimed; (4) whether the notice states with substantial accuracy the name of the party from which labor or material was furnished, and (5) whether notice is served by a means that provides written, third-party verification of delivery. From this information, a Miller Act score is determined. If all of the determinations are answered in the affirmative, then the Miller Act score equals one. Otherwise, the Miller Act score equals zero.

The information in the state and local projects category represents "little Miller Act" checklist items including: (1) whether notice was sent to all proper parties; (2) whether such notice was in writing; (3) whether notice was in the form of a sworn statement; (4) whether notice was given within time requirement; (5) whether the amount in material or labor meets minimum requirement; (6) whether the claim was filed within the time period required; and (7) whether all other "little Miller Act" requirements have been fulfilled. From this information, a little Miller Act score is determined. If all of the determinations are answered in the affirmative, then the little Miller Act score equals one. Otherwise, the little Miller Act score equals 0.

The information in the private contracts category represents private bond requirements including: (1) whether any payment bond exists and is paid up; (2) whether notice was made during the contractual period, or can be made later; (3) whether the bond covers the work in dispute and the amount sought; (4) whether any other bond requirements have been fulfilled. From this information, a private bond score is determined. If all of the determinations are answered in the affirmative, then the private bond score equals one. Otherwise, the private bond score equals zero.

The proceeding information is used to calculated a collectibility score. In the current embodiment, the collectibility score equals one hundred times the maximum of either: (1) the potential Obligor viability score divided by ten; (2) the Miller Act score; (3) the little Miller Act score; or (4) the private bond score.

Cost Worksheet

FIG. 10 shows a section of the spreadsheet 100 that comprises an information entry and calculation section 140 for determining a cost amount 142. In the current embodiment, information is organized into several categories including: (1) Nature of proceedings; (2) Venue; (3) Discovery; (4) Motion Practice; (5) Experts; and (6) Complexity of Case.

The information in the nature of proceedings category comprises yes/no selections regarding: (1) whether the contract contains an arbitration clause; (2) whether the contract contains a jury waiver; and (3) whether the contract mentions mediation as a prerequisite to action. A numerical score is calculated for each of these determinations. If there is an arbitration clause, the arbitration score equals zero. If not, then the arbitration score equals 0.2. If there is a jury waiver, then the jury waiver score equals zero. If not, then the jury waiver score equals 0.15. If there is a mediation prerequisite, then the mediation score equals 0.03. If not, then the mediation score equals zero. These three scores are then added together to yield a nature of proceedings subtotal.

The information in the venue category comprises numerical representations of: (1) location of the forum relative to witnesses and the project site; (2) the favorability of the venue; (3) the speed of the docket; and (4) any unusual additional venue costs. A score is calculated for each of these numerical representations. If the distance between the forum and witnesses and/or project site is greater than one hundred miles, then the location score equals 0.005. Otherwise, the location score equals zero. If the favorability representation is greater than six, then the favorability score equals −0.005 multiplied by the result of the favorability representation minus six. Otherwise, the favorability score equals zero. If the docket speed representation is greater than or equal to six, then the docket speed score equals −0.01 multiplied by the result of the docket speed representation minus six. Otherwise, the docket speed score equals zero. If the additional costs percentage is greater than ten percent, then the additional cost score equals 0.1. Otherwise, the additional cost score equals the additional cost percentage. These scores are added together to yield a venue subtotal.

The information in the discovery category comprises yes/no selections regarding: (1) whether written discovery is allowed, and/or (2) whether oral discovery is allowed. A numerical score is calculated for each of these determinations. If written discovery is allowed, then the written discovery score equals 0.04. Otherwise, the written discovery score equals zero. If oral discovery is allowed, then the oral discovery score equals 0.15. Otherwise, the oral discovery score equals zero. These scores are added together to yield a discovery subtotal.

The information in the motion practice category comprises the following information: (1) the number of significant or dispositive motions from the Claimant; and (2) the number of anticipated significant or dispositive motions from the opposition. A score is calculated for each of these numerical representations. If the number of claimant motions is greater than or equal to one, then the claimant motion score equals 0.03 multiplied by the number of claimant motions. Otherwise, the claimant motion score equals zero. If the number of opposition motions is greater than or equal to one, then the opposition motion score equals 0.02 multiplied by the number of opposition motions. Otherwise, the opposition motion score equals zero. These two scores are added together to yield a motion subtotal.

The information in the experts category comprises the following information: (1) yes/no selections regarding whether the following types of outside experts are needed: (a) mechanical; (b) electrical; (c) HVAC; (d) impact damage; and (e) accounting/project management/bond issue; and (2) the number of other experts required. For each of these selections and for the number of experts required, scores are calculated. If mechanical experts are needed, the mechanical expert score equals 0.1. If not, the mechanical expert score equals zero. If electrical experts are needed, the electrical expert score equals 0.1. If not, the electrical expert score equals zero. If HVAC experts are needed, the HVAC expert score equals 0.1. If not, the HVAC expert score equals zero. If impact damages experts are needed, the impact damages expert score equals 0.35. If not, the impact damages expert score equals zero. If accounting/project management/bond issue experts are needed, the accounting/project management/bond issue expert score equals 0.1. If not, the accounting/project management/bond issue expert score equals zero. If the number of other experts is greater than or equal to one, then the other expert score equals 0.1 multiplied by the number of other experts. These scores are added together to yield an expert subtotal.

The information in the complexity of case category comprises the following information: (1) the number of discrete issues; (2) a determination as to whether there are likely counterclaims; and (3) a determination as to whether there is potential for third party claims. Scores are calculated for the number of discrete issues and also for each determination. If the number of discrete issues is greater than two, then the number score equals 0.05 multiplied by the result of the number of discrete issues minus two. Otherwise, the number score equals zero. If there are likely counterclaims, the counterclaims score equals 0.05. Otherwise, the counterclaims score equals zero. If there are potential third party claims, the third party claims score equals 0.05. Otherwise, the third party claims score equals zero. These scores are added together to yield a complexity of case subtotal.

From this information, a cost snapshot amount is calculated. In this embodiment, the cost snapshot is a base amount of $150,000 or 10% of the claim amount, whichever is higher, multiplied by the sum of: (1) the nature of proceedings subtotal; (2) the venue subtotal; (3) the discovery subtotal; (4) the motion subtotal; (5) the expert subtotal; and (6) the complexity of case subtotal.

Summary Report Worksheet

FIG. 11 shows a section of the spreadsheet 100 that comprises an information calculation section 150 for determining a claim analysis valuation or likely recoverable amount 152. The spreadsheet 100 comprises a formula for calculating a likely recoverable amount using the undisputed portion, the disputed portion, the likelihood of success, the collectibility score, the counterclaim amount, and the cost amount. Specifically, the anticipated disputed portion of the claim (Claim Worksheet) is multiplied by the success score (Success Worksheet) to yield an adjusted disputed portion amount. The adjusted disputed portion amount is added to the known undisputed portion of the claim (Claim Worksheet) to yield a claim value subtotal. The claim value subtotal is multiplied by the collectibility score (Collectibility Worksheet) to yield an adjusted claim value. The counterclaim snapshot amount (Counterclaim Worksheet) and the cost snapshot amount (Cost Worksheet) are then subtracted from the adjusted claim value to yield the claim analysis valuation.

FIG. 13 is a schematic representation of a data structure 160 according to the present invention. The data structure comprises a first field 162 comprising data representing a disputed claim amount, a second field 164 comprising data representing a likelihood of success score, and a third field 166 comprising data representing a potential claim valuation. The potential claim valuation is derived at least from the first 162 and second 164 fields.

The data structure may comprise additional data. For instance, the data structure may comprise: (1) a first field containing data representing an undisputed claim portion and a disputed claim portion; (2) a second field containing data representing a success score; (3) a third field containing data representing an adjusted disputed claim portion derived from the first field and the second field; (4) a fourth field containing data representing a collectability score; (5) a fifth field containing data representing an adjusted claim value derived from the first field, the third field and the fourth field; (6) a sixth field containing data representing a counterclaim value; (7) a seventh field containing data representing a cost value; and (8) an eight field containing data representing a claim analysis valuation derived from the fifth field, the sixth field and the seventh field.

An alternative data structure may comprise: (1) a subcontractor field containing data representing an adjusted value of subcontractor's claims; (2) a lost profit field containing data representing an adjusted loft profit damages; (3) an impact damages field containing data representing an adjusted impact damages; (4) a contract claim value field containing data representing an adjusted contract claim value; (5) a claim snapshot field containing data derived from the subcontractor field, the lost profit field, the impact damages field and the contract claim value field; (6) a success category field containing data representing a plurality of success related categories; (7) a success category success field containing data representing a success score for each success related category; (8) a success category weighting factor field containing data representing a weighting factor for each success related category; (9) a success score field containing data derived from the success category field, the success category success field and the success category weighting factor field; (10) an impact of filing a claim field containing data pertaining to the possibility of a counterclaim; (11) an evaluation of counterclaim field containing data pertaining to the merits of a counterclaim; (12) a counterclaim potential value field containing data pertaining to the potential value of a counterclaim; (13) a counterclaim value field containing data derived from the impact of filing a claim field, the evaluation of counterclaim field and the counterclaim potential value field; (14) a federal requirements field containing data pertaining to federal collection requirements; (15) a state requirements field containing data pertaining to state collection requirements; (16) a private bond field containing data pertaining to private bond collection requirements; (17) a perceived payment field containing data pertaining to a perceived ability of obligor as primary payor; (18) a collectability score field containing data derived from the federal requirements field, the state requirements field, the private bond field and the perceived payment field; (19) a litigation category field containing data representing a plurality of litigation related categories; (20) a litigation category rank field containing data representing a rank for each litigation related category; (21) a litigation category weighting factor field containing data representing a weighting factor for each litigation related category; (22) a cost value field containing data derived from the litigation category field, the litigation category rank field, the litigation category weighting factor field, and the claim snapshot field; (23) a claim analysis valuation field derived from the claim snapshot field, the success score field, the counterclaim value field, the collectability score field, and the cost value field.

While the present invention has been described with reference to specific embodiments, one of ordinary skill in the art will appreciate that changes in form and detail may be made without departing from the scope of the invention as it is defined in the claims.

The invention claimed is:

1. A method for estimating a likely recoverable amount on a claim, the method comprising:
   determining an undisputed portion of a claim by entering a first set of information into a software application hosted on a computer;
   determining a disputed portion of the claim by entering a second set of information into the software application;
   estimating a likelihood of success in recovering the disputed portion of the claim by entering a third set of information into the software application;
   determining a collectibility score by entering a fourth set of information into the software application;
   estimating a likely counterclaim amount by entering a fifth set of information into the software application;
   determining a cost amount by entering a sixth set of information into the software application; and
   calculating a likely recoverable amount via the software application by using the undisputed portion, the disputed portion, the likelihood of success, the collectibility score, the counterclaim amount, and the cost amount.

2. The method for estimating a likely recoverable amount on a claim of claim 1 wherein the software application comprises a spreadsheet.

3. The method for estimating a likely recoverable amount on a claim of claim 1 wherein the software application comprises a question and answer type application.

4. The method for estimating a likely recoverable amount on a claim of claim 1 wherein the software application comprises a graphical user interface.

5. The method for estimating a likely recoverable amount on a claim of claim 1 wherein the computer comprises a personal computer.

6. The method for estimating a likely recoverable amount on a claim of claim 1 wherein the computer comprises a web server.

7. The method for estimating a likely recoverable amount on a claim of claim 1 wherein the software application is downloadable to the computer based platform from a web server.

8. The method for estimating a likely recoverable amount on a claim of claim 1 wherein the web server is accessed via a personal computer over the Internet in a secure manner.

9. The method for estimating a likely recoverable amount on a claim of claim 1 wherein the calculating step adapts based on actual historical information presented to the software application in a learning mode.

10. The method for estimating a likely recoverable amount on a claim of claim 1 wherein the determining steps adapt based on actual historical information presented to the software application in a learning mode.

11. The method for estimating a likely recoverable amount on a claim of claim 1 wherein any of the estimating steps adapt based on actual historical information presented to the software application in a learning mode.

12. The method for estimating a likely recoverable amount on a claim of claim 1 wherein the first set of information and the second set of information each include at least one of base contract information, change order information, waiver provision information, quality of documentation information, margin information, total job cost information, project retention information, amount paid information, amounts outstanding information, impact damages information, lost profits information, and subcontract work information.

13. The method for estimating a likely recoverable amount on a claim of claim 12 wherein the impact damages information includes at least one of conventional impact damages information, lost labor productivity information, Eichleay Damages information, and reduction factors information.

14. The method for estimating a likely recoverable amount on a claim of claim 1 wherein the third set of information includes at least one of degree of a claimant's expertise information, quality of bid information, quality of claimant's work information, quality of claimant's subcontractors information, percentage of work performed by subcontractors information, likely testifying witnesses for claimant information, third party information, anticipated opposing party witnesses information, and quality of documentation information.

15. The method for estimating a likely recoverable amount on a claim of claim 1 wherein the fourth set of information includes at least one of viability of obligor information and nature of alternative/secondary payor information.

16. The method for estimating a likely recoverable amount on a claim of claim 15 wherein the nature of alternative/secondary payor information includes at least one of federal government information, state government information, local government information, and private bond information.

17. The method for estimating a likely recoverable amount on a claim of claim 1 wherein the fifth set of information includes at least one of specific counterclaims anticipated information, claimant's valuation of counterclaim information, counterclaimant's valuation of counterclaim information, and weighted average of counterclaim information.

18. The method for estimating a likely recoverable amount on a claim of claim 1 wherein the sixth set of information includes at least one of venue information, discovery information, motions information, experts information, complexity of case information, and nature of proceedings information.

* * * * *